April 9, 1929.  N. A. CHRISTENSEN  1,707,974
TRAILER VEHICLE BRAKE APPARATUS
Filed Feb. 8, 1926  2 Sheets-Sheet 1
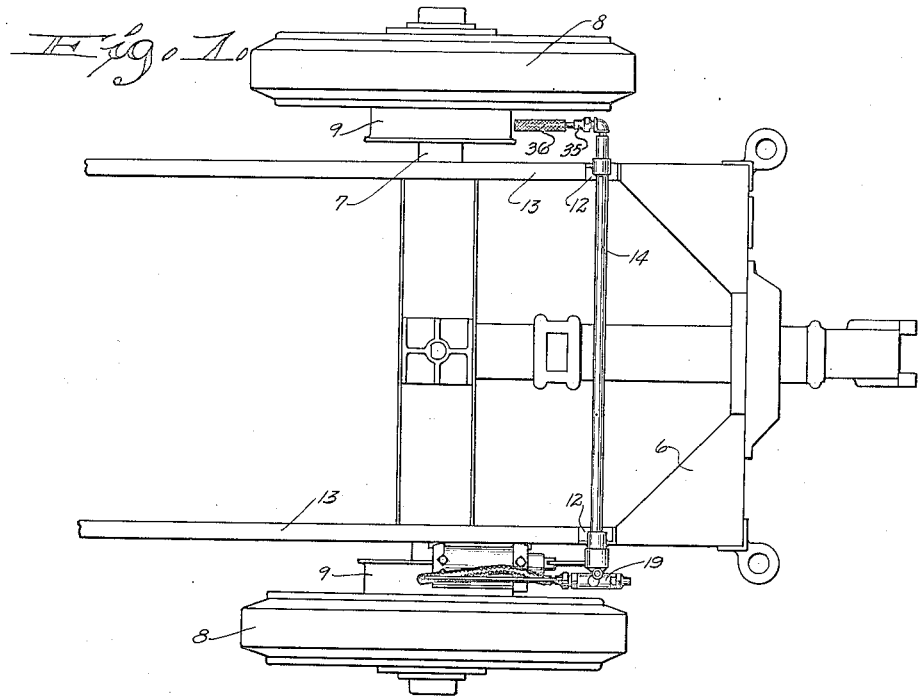
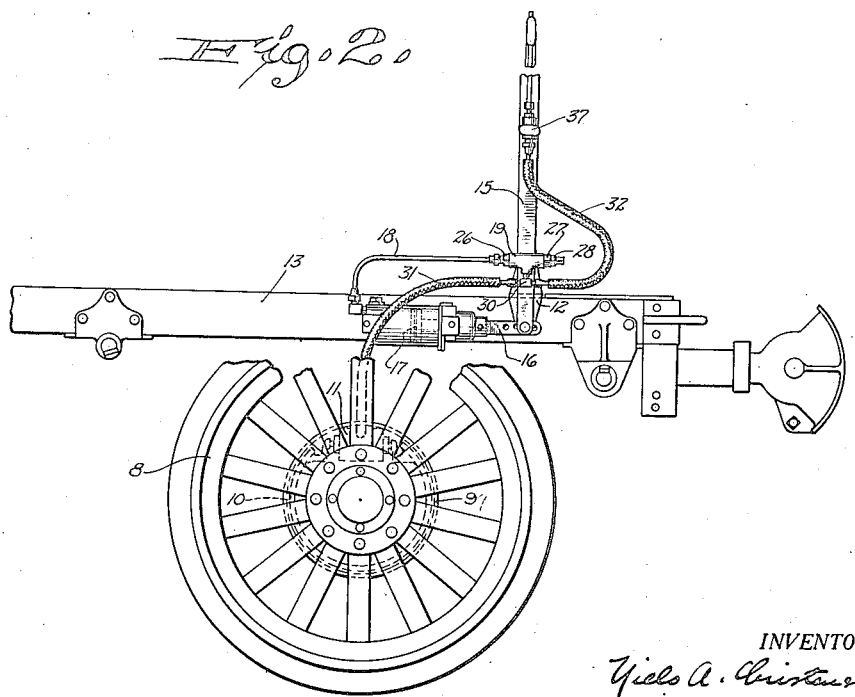
INVENTOR.
Niels A. Christensen
BY
Charles & French
ATTORNEYS

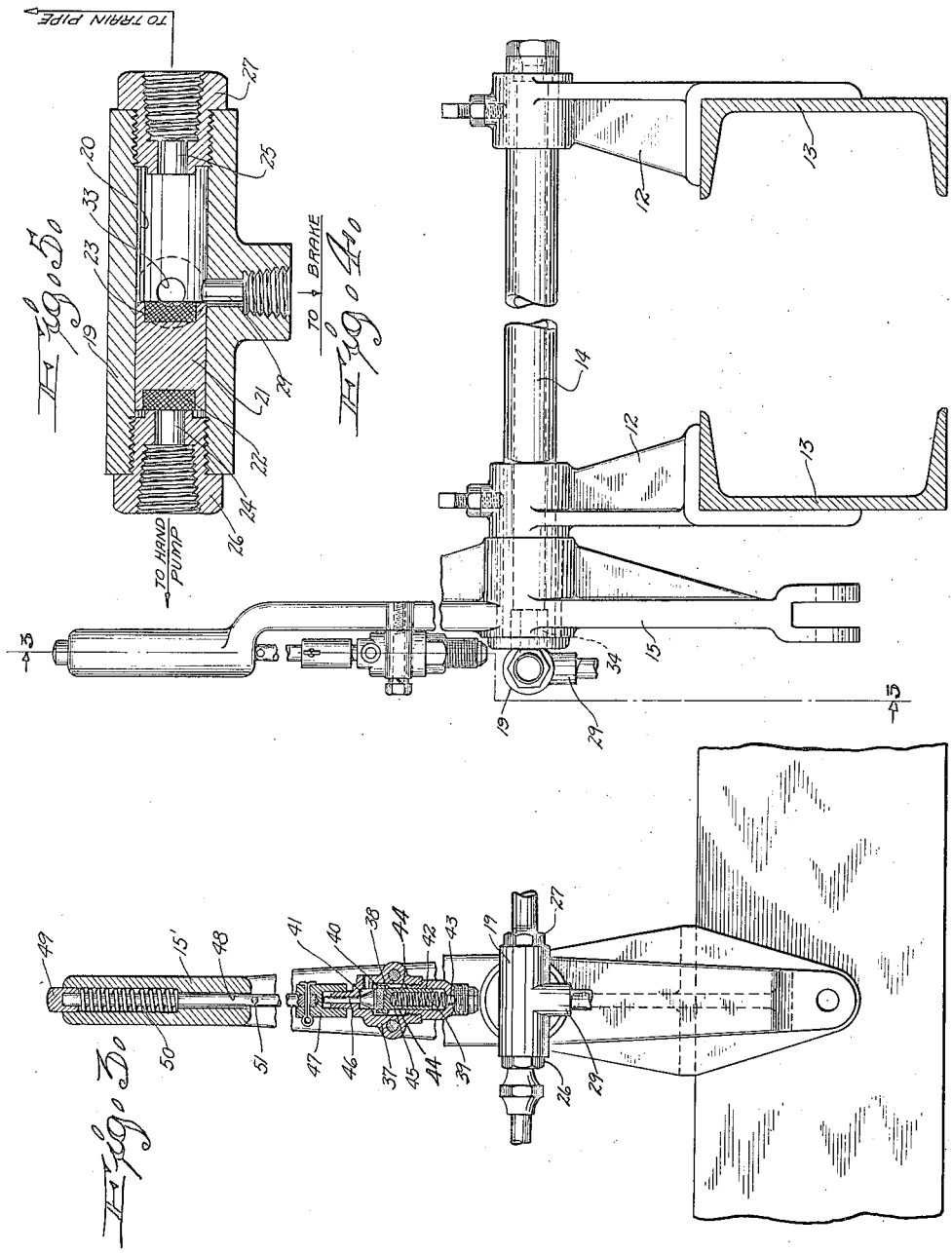

Patented Apr. 9, 1929.

1,707,974

UNITED STATES PATENT OFFICE.

NIELS A. CHRISTENSEN, OF CLEVELAND, OHIO.

TRAILER-VEHICLE BRAKE APPARATUS.

Application filed February 8, 1926. Serial No. 86,848.

The invention relates to vehicle brake apparatus, and more particularly to brake apparatus used in connection with trailer vehicles in automotive trains.

Because of the condition of the service in which the trailer vehicles are used, such vehicles are provided with a separate brake for use when detached from the train, and heretofore such brakes have been of the usual mechanical type. One object of this invention is to provide a brake apparatus for trailer vehicles in which the brakes are applied by a fluid-pressure-operated motor which is associated with a manually-operated pump.

A further object of the invention is to provide a fluid-pressure-operated brake for trailer vehicles which may be associated with a manually-operated pump or with a train pipe so that the brake may be used when the trailer forms a part of a vehicle train or when it is used as an independent unit.

The invention further consists in the several features hereinafter set forth and more particularly defined by claims at the conclusion hereof.

In the drawings, Fig. 1 is a plan view of brake apparatus embodying the invention;

Fig. 2 is a side elevation view of brake apparatus embodying the invention, parts being broken away;

Fig. 3 is a front elevation view of the pump actuator, parts being shown in section along the line 3—3 of Fig. 4;

Fig. 4 is a side elevation view of the pump actuator;

Fig. 5 is a detail sectional view of the intercepting valve.

In the drawings the numeral 6 designates the body frame of a trailer vehicle, 7 one of the wheel axles, and 8 the wheels mounted thereon. One or both of the wheels may be provided with a brake drum 9, and a brake shoe or brake band 10, of any suitable construction, is operatively associated with a fluid-pressure-operated motor or brake cylinder 11 which is used to apply the brake member or members to the drum. As any suitable form of brake and motor may be used in the system, and as the invention does not reside in the specific form of such brake, further description and showing is deemed unnecessary. As showing one form of brake cylinder and certain forms of brakes, reference may be had to my United States Letters Patent No. 1,620,073, of March 8, 1927.

Mounted upon supporting brackets 12, associated with the side bars 13 of the frame 6, is a hollow shaft 14, and journalled on one end of said shaft is a pump-operating lever 15 which is operatively connected at its lower end, by a link 16, to the piston (not shown) of any suitable air pump 17, but preferably a double-acting air pump, with the result that when said lever 15 is oscillated the air pump will be actuated to furnish compressed air to the brake cylinder or cylinders of the trailer vehicle, the numeral 18 designating the discharge line or pipe from the pump.

Mounted upon the end of the shaft 14 is an intercepting valve mechanism including a casing 19 having a bore 20 in which a piston 21 is slidably movable. This piston has valve-seat plates 22 and 23 inset in its ends which are respectively adapted to close off ports 24 and 25 in plugs or fittings 26 and 27. The plug 26 is connected with the discharge pipe 18, while the plug 27 has a suitable nipple 28 for connection with the air hose of the train pipe. Midway between the ports 24 and 25 is a port 29 which is connected to the center connection of a T-fitting 30. One end of said fitting 30 is connected by flexible piping 31 to the brake cylinder 11 of the wheel adjacent the pump and the other end of said fitting is connected by flexible piping 32 to relief valve mechanism hereinafter described. Where wheels on the opposite sides of the vehicle are both provided with brakes, a port 33 in the casing 19, and extending through a pipe-threaded end 34 of said casing which is screwed into the end of the hollow shaft 14, allows compressed air to pass therethrough, or be released therefrom, said shaft having a suitable nipple 35 at its other end connected by flexible tubing 36 with the brake cylinder (not shown) associated with the wheel on the other side of the vehicle.

Mounted upon the lever 15 is a two-part casing 37 in which a relief valve 38 is mounted and normally seated by a spring 39 against a seat 40 surrounding an end of a relief port or passage 41. The valve 38 has its tubular stem working in a bore 42 connected by a port 43 with the pipe 32, and has openings 44 to permit passage of air to a bore 45 and thence to the passage 41 and to atmosphere when the valve 38 is opened. The valve is opened manually by a pin 46 movable into engagement with the valve by pressure upon its stem from a manually-operated means consisting of a tappet member 47 slidably mounted and guided on the upper end of the casing 37, and connected to a rod 48 slidably mounted in the operating handle 15' of said lever 15 and having a push-button head 49 projecting above said handle. The rod is normally moved outwardly by a spring 50, in the handle, interposed between said handle and said head 49, and is limited in its outward movement by a pin 51 extending through it and engageable with the lower end of said handle. When the operator presses down on the head 49 the rod 48 is moved down, causing the tappet 47 to depress the pin 46 which in turn moves the valve 38 off its seat to a release position.

When not operated as a part of a vehicle train, the trailer vehicle may have its brakes applied by the operator actuating the lever 15, and hence the pump 17, to supply compressed air to the brake cylinder 11 to apply the brake 10 to the drum 9 of one or more of the wheels, and the braking pressure may thereafter be relieved to permit release of the brake or brakes by opening relief valve 38 in the manner previously described. In case of such operation, it will be noted that as the pressure builds up in the discharge pipe 18 this pressure will act to shift the piston 21 away from the port 24 and cause the seat 23 to seal the inner end of the port 25, thus cutting off escape of air through the then open nipple 28. Thus the brake apparatus will function under power supplied by the operator. When the trailer vehicle is connected up in a train the train or brake pipe which delivers or releases compressed air to the brakes is connected to the nipple 28 and then compressed air is furnished direct to the casing 19 and thence to the pipe 31 and conduit in shaft 14 and pipe 36 to operate the brake cylinders, it being noted that under such conditions the release and application of the pressure-fluid is controlled independent of the hand-pump and the valve 38, and that when pressure builds up in the train pipe line the piston 21 is moved over to the position shown in Fig. 2, thus cutting off the pipe 18 and its connection with the hand-pump 17. As showing one system for furnishing air from a pressure or train pipe, reference may be had to my United States Letters Patent No. 1,614,652, of January 18, 1927.

Thus, it will be noted that I have provided a braking apparatus in which a fluid-pressure-operated motor applies the brake from a manually operated pump with the release under ready control of the operator, and that this same motor may be connected with the power-actuated braking system when the trailer is connected to its tractor vehicle or to other trailer vehicles associated with such tractor vehicle and forming a vehicle train.

What I claim as my invention is:

1. In brake apparatus for trailer vehicles, the combination with the fluid-pressure-operated brake including a brake cylinder, of a hand-pump for supplying pressure fluid to said cylinder, actuating means for said pump, and a relief valve associated with said cylinder carried on said actuating means and under the control of the operator.

2. In brake apparatus for trailer vehicles having a fluid-pressure-operated brake including a brake cylinder, the combination of a manually-operated pump for supplying fluid to said cylinder, actuating means for said pump, a relief valve carried on said actuating means and under the control of the operator, a pressure pipe connection for said cylinder, and a valve movable under the pressure of fluid from the pump to cut off said connection and under pressure from said connection to cut off said pump.

3. In brake apparatus for trailer vehicles having a fluid-pressure-operated brake including a brake cylinder, the combination of a pump for supplying pressure fluid to said cylinder, a hand lever for operating said pump, and a relief valve associated with said cylinder and mounted on said lever and under the control of the operator.

4. In brake apparatus for trailer vehicles having a fluid-pressure-operated brake including a brake cylinder, the combination of a pump for supplying pressure fluid to said cylinder, a hand lever for operating said pump, a relief valve associated with said cylinder and mounted on said lever, and means including an operator-actuated push-rod on the handle of said lever for opening said relief valve.

In testimony whereof, I affix my signature.

NIELS A. CHRISTENSEN.